Dec. 13, 1955  S. J. GARTNER  2,727,122
RESISTANCE WELDER
Filed March 29, 1952
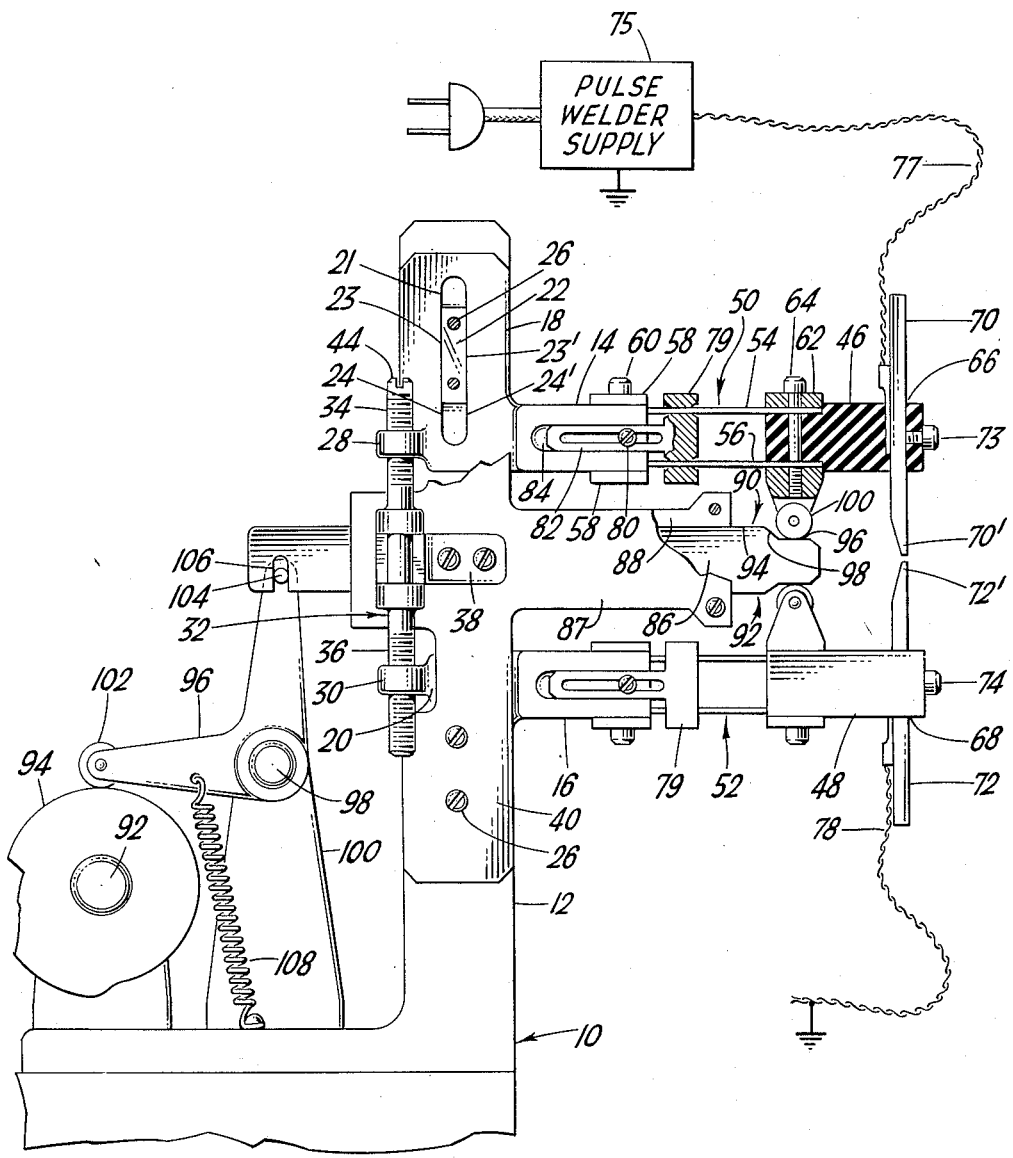
INVENTOR
STANLEY J. GARTNER
BY Paul S. Martin
ATTORNEY

United States Patent Office 2,727,122
Patented Dec. 13, 1955

2,727,122

RESISTANCE WELDER

Stanley Jacob Gartner, Emporium, Pa., assignor to Sylvania Electric Products Inc., a corporation of Massachusetts Application March 29, 1952, Serial No. 279,277

13 Claims. (Cl. 219—4)

The present invention relates to welding apparatus.

In resistance welding, various arrangements are known for applying the required welding pressure to work pieces and for maintaining this pressure during the weld time by follow-up of the welding electrodes as the work melts locally. The principal arrangements are designated the "rocker arm" type and the "pressure" type.

In the rocker arm type of resistance welder, one or both of the electrodes or welding tips are supported on pivoted arms. When engaging the work-pieces, it is advantageous for the contact surfaces of the electrodes to be parallel, for the electrodes to be aligned, and for the arms to be substantially parallel and horizontal. Any other settings result in variations of pressure at different parts of the work-contacting area and during successive welds. Electrode skidding may also occur, causing additional flaws in the welds. The arcuate movement of the electrodes or welding tips renders it difficult to obtain and maintain the desired settings. Further, rocker arm systems inherently are subject to possible misalignment of the electrodes due to looseness or "play" in the pivotal bearings, present initially or occasioned by wear.

Some of these disadvantages have been overcome by a so-called pressure type system in which one or both of the electrodes and welding heads are movable along a substantially straight line and guided in bearings or ways. The bearings must be of a sufficient length to withstand offset loads, a factor tending to increase the mass of welding heads. Further, even with bearings accurately machined of wear resistant materials, it is difficult to assure linear movement and perfect alignment of the electrodes and their respective contact surfaces, especially with very small work pieces.

If the contact surfaces of the electrodes are not substantially parallel only a percentage of the contact area will be under pressure. The applied working pressure is then concentrated in an area of reduced size resulting in indentation as well as surface over-heating. Similarly, where there is misalignment of the electrodes and their contact surfaces, the quality of the welds suffers.

The adverse effects of misalignment are greatly magnified when the contact area of the electrodes is made small to minimize the possibility of metal pick-up or sticking of the electrodes. Accordingly, relatively minor misalignments brought about by manufacturing techniques, permissible tolerances, and the subsequent wearing of the bearings, cause random pressure increases and decreases. Insufficient welding force or pressure often results in weak welds, expulsion, surface burning and other defects, while too much pressure may bring about indentation and insufficient welding heat due to lowered contact resistance. The bearings in both the rocker arm and pressure type welders inherently risk producing these defects.

An additional important factor in considering any welding mechanism is in the way in which the electrodes stay with the work surfaces or follow up the weld surface as the weld section decreases due to internal melting. This "follow-up" charatceristic is affected by the mass of the movable structure supporting the movable electrode, by the length of the arm in the case of rocker-arm welders, and by the force applied to the movable structure. This applied force should be an independent factor in order that the weld characteristics may be effectively controlled. The follow-up is generally an uncontrolled factor where the geometry of the welder is fixed and the work welded is changed from time to time. While an inherently low inertia welding head is greatly to be desired, the foregoing types of welders inherently require relatively high inertia heads.

It is an object of the present invention to provide a novel welding mechanism to avoid or minimize disadvantages of known welding mechanisms.

It is another object of the present invention to provide resistance welding equipment having a low inertia, fast "follow-up" welding head.

It is a further object of the present invention to provide a mechanical system for resistance welding equipment in which the welding force or pressure can be accurately adjusted and maintained at its adjusted value.

A still further object of the present invention is the provision of a mechanical pressure-applying system for welding devices in which the "follow-up" can be readily controlled.

A still further object of the present invention is the provision of a mechanical system for welding equipment in which the electrodes are movable relative to each other yet maintain accurate endwise alignment, thereby to minimize pressure variations brought about by changes in the effective electrode contact area.

A still further object of the present invention is the provision of devices in which the initial welding pressure and the "follow-up" can both be adjusted to optimum values, as may be required by different welds.

Briefly described, one of the electrodes of a welding machine is provided with a resilient member for urging the one electrode toward another. The resilience of this member is capable of adjustment in order to vary the follow-up of the welding head during a welding operation. A separate adjustment is provided for varying the level of stress energy stored in the resilient support, thus obtaining relatively independent control of the initial pressure applied to the weld.

More specifically, as will be seen in the illustrative embodiment below, the welding heads are of no greater mass than necessary to hold an electrode or welding tip. A pair of welding tips are accurately supported in endwise alignment with each other, each by means of a pair of spaced leaf springs, the ends of which are fixed respectively to the movable welding head and to a fixed part of the machine. In operation the leaf springs are deflected in separating the electrodes to insert a work-piece and in returning to engage the work pieces, successively. The spaced leaf springs of each welding head are separated along this direction of deflection. With this arrangement, the electrodes may be spread apart and, when released, they are uniformly directed and biased toward each other. The faces of the welding tips are maintained flat against the work surface during the "follow-up" without danger of "rocking" or slant engagement with the work. The welding heads are virtually the only components movable upon deflection of the leaf springs, and therefore the systems can be constructed with a relatively low inertia head. This inherently low inertia head may be advantageously utilized to obtain a rapid "follow-up."

The effective length of the leaf springs is controlled so that the electrodes stay with the weld as the thickness of the weld section decreases during the weld time. The initial pressure that is designed to effect good welds is separately controlled, by adjusting the position of those ends of the springs that are fixed during operation.

The various aspects and features of the present invention may be more fully understood by reference to the following detailed description of a presently preferred, illustrative embodiment shown in the accompanying drawing, which is a side elevation, partly broken away and in section.

In the drawing frame 10 has a standard 12 carrying the horizontally extending arms 14, 16. Secured to or formed integrally with the arms 14, 16 are the bases 18, 20 which are mounted for vertical adjustment on the standard 12. Since the base 18 of arm 14 is constructed and arranged in the same manner as the base 20 of arm 16, it will suffice to describe only the former in detail. The base 18 is provided with a longitudinally extending slot 21 which tightly engages a vertical guide member 22 secured on standard 12 by screws 26. The guide member 22 and slot 21 cooperate to permit vertical movement of arm 14 and its base 18 within the limits determined by the relative lengths of the guide member and the slot. This guide or bearing member is accurately machined of durable and wear resistant material and includes opposed bearing surfaces 23, 23' which guide against walls 24, 24' of the slot 21. These bearing surfaces 23, 23' are of a length sufficient to prevent base 18 from rocking. Since base 18 is adjusted at infrequent intervals, there is no danger of looseness developing because of wear.

The vertically adjustable bases 18, 20 carry internally threaded ears 28, 30 which engage threaded portions 34, 36 of a double, reverse-threaded adjustment screw 32. The adjustment screw 32 is constrained against endwise motion by a bracket 38 carried on cover plate 40 for rotation about a vertical axis parallel to the stroke of the welding electrodes. Cover plate 40 is secured to the standard 12 by screws 26. Plate 40 and standard 12 form firm lateral bearings for bases 18 and 20. Slotted end 44 of screw 32 is rotated by a screw driver to effect movement of the arms 14, 16 toward and away from each other.

Spaced outwardly of the arms 14, 16 are the welding heads or electrode carriers 46, 48 which are mounted on the arms 14, 16 by suspensions 50, 52 of duplicate construction. Suspension 50 includes two horizontally disposed, vertically separated, leaf springs 54, 56 which appear edgewise in the drawing. These springs have one pair of adjacent ends fixed to the arm 14 by clamp 58 and screws 60 (only one appearing in this view) and have the other pair of adjacent ends fixed to the welding head 46 by clamp 62 and screws 64. To avoid lateral deflection of the welding heads 46, 48, each of the leaf springs 54, 56 is of great width compared to its thickness, to withstand unintentional lateral deflecting forces. It is thus apparent that each of the welding heads 46, 48 is protected against erratic movement by the rigid anchoring of the leaf springs and by adequate spring width.

Welding heads 46, 48 are of an electrically insulating material and are of no greater mass than necessary to hold the electrodes or welding tips or electrodes 70, 72. The welding heads 46, 48 are provided with vertically extending aligned passages 66, 68 shaped to receive and support the electrodes 70, 72 in endwise alignment with each other. Any suitable means such as screws 73, 74 are provided for gripping the electrodes, and for roughly adjusting the spacing between the work contacting electrode ends 70', 72'. This spacing is known as the "point separation." Alignment of the electrodes is initially established by careful adjustment of the spring-securing clamps 58 and 62.

A suitable electric pulse welder supply 75 is connected by pigtail leads 77, 78 to the respective electrodes 70, 72. The welder supply 75 is arranged in accordance with principles and practices well understood, per se, and accordingly detailed illustration and description is dispensed with as superfluous. Upon insertion of the work piece between the electrodes 70, 72, the electrical circuit is completed from the supply 75, through lead 77, electrodes 70, 72 and the work supported therebetween, and through lead 78 back to the supply 75.

The respective supporting assemblies for the electrodes 70, 72, include the horizontally aligned arms 14, 16, the resilient suspensions 50, 52, and the wleding heads 46, 48 and these suspensions bias the electrodes 70, 72 toward the work, with the work contacting ends 70', 72' in perfect alignment with each other and perpendicular to an imaginary reference plane representing the work.

The "follow-up" of the system may be readily regulated in accommodating different types of welds, by adjusting the effective length of the leaf springs 54, 56. Each of the suspensions 50, 52 is provided with identical adjustment blocks. Blocks 79 has slide passages receiving leaf springs 54, 56, and a pair of arms 82 embracing arm 14 (only one arm appearing in the drawing). These arms are tightly received in guideways 84 in the arm 14, and are fixed by screws 80 in any selected position of horizontal adjustment.

In order to insert the work pieces between the work contacting faces or welding surfaces 70', 72' of the electrodes 70, 72, suitable means is provided to spread the electrodes against the spring bias exerted by the suspensions 50, 52. For example, an operating or actuating member 86 is slidably mounted in an extension 88 of standard 12 for horizontal reciprocation. The actuating member 88 has upper and lower cam tracks 90, 92, each including a high portion 94, a dwell portion 96, and an inclined portion 98. Cam-follower rollers 100 are carried on the clamps 58, 62 of the respective heads 46, 48 and ride along cam tracks 90, 92. Separation of the electrodes to permit insertion of work-pieces to be welded together is effected in response to movement of the actuating member 86 out of the position shown and toward the right.

The actuating member 86 may be reciprocated by any suitable means, as by a motor-driven drive shaft 92 carrying a cam 94. The cam operates a bell crank lever 96 having pivot 98 on a support 100. The bell crank lever 96 carries a cam follower 102 on one arm thereof, the other arm being provided with a pin 104 received within a slot 106 in the underside of the actuating member 86. A tension spring 108 is connected to the bell crank lever 96 and to the frame 10 for biasing the cam follower 102 against the cam 94. Rotation of cam 94 reciprocates the actuating member 86 for causing periodic separation of the electrodes 70, 72. Pulse welding supply 75 is appropriately coordinated by suitable means not shown. The work is inserted periodicaly by hand or by a conveyor also appropriately coordinated.

In preparing for welding, the electrodes 70, 72 are inserted with the proper initial separation or "point opening". Preferably the work contacting surfaces 70', 72' are spaced apart a distance somewhat less than the initial thickness of the weld section. The suspension 50, 52 will be tensioned when the electrodes 70, 72 are moved away from each other by the actuating member 86. The tension of resilient suspensions 50, 52 to control the initial welding pressure is adjusted by screw 32 while the actuating member 86 is in the position illustrated.

The "follow-up" is adjusted in the following manner.

The work to be welded is inserted between the work-contacting surfaces 70', 72' of the electrodes and the initial welding pressure adjusted to a desired value. Thereafter a weld is made and the "follow-up" observed. If the "follow-up" is too slow, that is, if the electrodes do not stay with the weld as the weld section decreases, the weld will be weak and overburned. To increase the rate of "follow-up," the adjustment blocks 79 of the respective resilient suspensions 50, 52 are moved toward the adjacent welding heads to decrease the effective length of the leaf springs 54, 56. The resultant shorter resilient suspensions will have a faster "whip" and the "follow-up" will be proportionally increased. This increased "follow-up" will be accompanied by an increase in the initial welding pressure, which should then be restored to the optimum value by manipulating screw 32 once more. Adjustment of the effective length of the leaf springs and of the relative position of the welding heads 46, 48 is continued until perfect welds are made, showing that optimum pressure and "follow-up" are both attained.

It may develop that the follow-up is made too fast, as indicated by an unduly limited stroke permitted by abbreviated effective leaf-spring lengths. The welding pressure then decays excessively from its initial value as the weld section starts to decrease, and the welds are defective. The follow-up is made as fast as possible, consistent with proper initial welding pressure and with maintenance of welding pressure during the welding time, as the weld section diminishes.

Summarizing, blocks 79 affect the rate of follow-up as one variable, and screw 32 affects the initial pressure as an essentially separate variable. The "point separation" is determined by the initial setting of the welding tips or electrodes in the welding heads.

After arriving at the optimum welding pressure and "follow-up," the arms 14, 16 remain stationary throughout the production run. As previously pointed out, the infrequent adjustment of the arms 14, 16 and their respective bases 18, 20 does not cause any appreciable wear of its bearings. The rigid anchoring of the leaf springs prevents rocking of the faces 70′, 72′ of the welding tips 70, 72 such as would upset the desired distribution of welding pressure; and the leaf spring suspension prevents erratic operation such as might be occasioned by loose bearings, thus maintaining accurate alignment of the work contacting faces relative to each other and to the work, contributing materially to the production of uniformly good welds. The inherently low inertia heads of the present mechanism, promote fast "follow-up." Adjustment of the effective length of the resilient suspensions 50, 52 achieves a new control over the follow-up without sacrificing control over the initial welding pressure. Accordingly a single machine may be employed for making welds for a wide variety of materials of different weld sections.

While in accordance with the provisions of the statutes, I have illustrated and described the best form of embodiment of my invention now known to me, and it will be apparent to those skilled in the art that changes may be made in the form of the apparatus disclosed without departing from the spirit of my invention as set forth in the appended claims and that in some cases certain features of my invention may be used to advantage without a corresponding use of other features.

What is claimed is:

1. In resistance welding apparatus, a frame, means including a leaf spring for reciprocably supporting an electrode on said frame and biasing said electrode toward work-engaging position, and means operatively connected to said leaf spring for controlling its effective length.

2. Welding apparatus according to claim 1, including means for mounting said electrode-supporting means adjustably relative to said frame.

3. In a resistance welding device, a frame, a pair of horizontally extending arms having vertically adjustable mounts on said frame for adjustment relative to each other, a welding head for each of said arms, and suspension means operatively connected to each arm and the adjacent welding head for mounting said welding heads for reciprocation relative to said arms, each of said suspension means including at least one flexible member having one end rigidly connected to the adjacent arm and having the other end rigidly connected to the adjacent welding head.

4. A resistance welding device according to claim 3, including manually operable means connected to the respective flexible members for adjusting the effective lengths of said flexible members.

5. Resistance welding apparatus comprising a frame, a pair of horizontal arms adjustably mounted on said frame for movement relative to each other, and including devices establishing any desired relative adjustment of said arms, supporting means operatively connected to each of said arms for carrying a pair of electrodes in endwise alignment with each other, each of said supporting means including a welding head spaced from the adjacent arm and a pair of vertically spaced parallel, horizontally extending leaf springs connected rigidly at the extremities thereof to said welding head and to said adjacent arm, a horizontally disposed actuating member arranged intermediate said arms and mounted on said frame for horizontal reciprocable movement and in operative engagement with said welding heads for periodically separating said electrodes to enable insertion and removal of work pieces, and an actuator operatively connected to said actuating member for effecting said reciprocable movement.

6. Resistance welding apparatus according to claim 5, including an adjustment block operatively connected to each of said springs and movably mounted on the arms for regulating the stiffness of said leaf springs.

7. A mechanical system for resistance welding equipment comprising a frame, a horizontal arm having a vertically adjustable mounting on said frame, and including a device establishing any predetermined adjustment of said arm relative to said frame, support means operatively connected to said arm for carrying an electrode, said support means including a welding head spaced from said arm, and a pair of substantially horizontally extending vertically separated leaf springs connected rigidly at the extremities thereof to said welding head and to said arm, a horizontally disposed actuating member arranged adjacent said arm and mounted on said frame for reciprocal movement and in operative engagement with said welding head for periodically tensioning said pair of leaf springs, and an actuator operatively connected to said actuating member for effecting said reciprocable movement.

8. A mechanical system for welding equipment, comprising a frame, a pair of electrodes, means on said frame for reciprocably supporting each of said pair of electrodes in a work-engaging position and in endwise alignment with each other, said means including at least a parallel pair of leaf springs spaced from each other along the line of reciprocation of said electrodes and operatively connected to each of said electrodes for opposing the movement of said electrodes out of said work-engaging position and means operatively connected to said leaf springs for controlling the effective length of said springs.

9. Resistance welding apparatus including a fixed support, a welding head spaced from said support and suspension means including an inextensible fixable element rigidly connected to said support and to said welding head, reciprocably mounting said welding head free of bearing play, said suspension means including at least two parallel leaf springs separated from each other in the direction of reciprocation of the welding head and having one pair of adjacent ends fixed to said support and having the other pair of adjacent ends fixed to said welding head and separated from said first pair of fixed ends by a free length of said leaf springs, said suspension means including means operatively connected to said leaf springs for adjusting the free lengths thereof.

10. A resistance welder including a movable welding head, an arm, a frame supporting said arm, support means for connecting said welding head to said arm, said support means including a pair of substantially parallel leaf springs spaced along the direction of motion of said head and having one pair of adjacent ends rigidly connected to said welding head and having the other pair of adjacent ends rigidly connected to said arm and separated from said first pair of adjacent ends by a free length of said leaf springs, said support means also including an adjustment block mounted on said leaf springs for movement therealong, securing means operatively connected to said adjustment block and to said arm for fixing said adjustment block in a select position of its movement, and means on said frame and periodically engaging said support means for moving said welding head relative to said arm against the bias of said springs.

11. Resistance welding apparatus including: means for supporting a pair of welding electrodes in operative relationship; resilient means for urging said electrodes toward each other; means for varying the resilience of said resilient means; and means for varying stress energy stored in said resilient means; said means for varying the resilience of said resilient means having substantially no effect on the level of stress energy stored in said resilient means.

12. Resistance welding apparatus including: means for supporting a pair of welding electrodes in operative relationship; at least one spring for urging said electrodes toward each other; means for varying the effective length of said spring; and means for varying stress energy stored in said spring, said means for varying the effective length of said spring having substantially no effect on the level of stress energy stored in said resilient means.

13. Resistance welding apparatus including: a frame, holders for a pair of welding electrodes, a support connected to said frame and to one of said holders for maintaining said holder in operative position; resilient means connected to said support for urging said holder towards another holder; means for varying the resilience of said resilient means; and means for varying the level of stress energy stored in said resilient means, said means for varying the resilience of said resilient means having substantially no effect on the level of stress energy stored in said resilient means.

References Cited in the file of this patent

UNITED STATES PATENTS

| | | |
|---|---|---|
| 1,610,616 | Schlaf | Dec. 14, 1926 |
| 2,278,104 | Harter | Mar. 31, 1942 |
| 2,421,021 | Ellwood | May 27, 1947 |
| 2,474,340 | Warner | June 28, 1949 |